US012680046B2

(12) United States Patent (10) Patent No.: US 12,680,046 B2

Sumant et al. (45) Date of Patent: Jul. 14, 2026

(54) LOW FRICTION COATINGS

(71) Applicants: John Crane Inc., Chicago, IL (US); UChicago Argonne LLC, Chicago, IL (US)

(72) Inventors: Anirudha V. Sumant, Plainfield, IL (US); Kalyan C. Mutyala, Clarendon Hills, IL (US); Jiao Yang, Chicago, IL (US); Jorge Pacheco, Chicago, IL (US); Klaus Meck, Chicago, IL (US)

(73) Assignees: JOHN CRANE INC., Chicago, IL (US); UCHICAGO ARGONNE, LLC, Chicago, IL (US)

( * ) Notice: Subject to any disclaimer, the term of this patent is extended or adjusted under 35 U.S.C. 154(b) by 0 days.

(21) Appl. No.: 18/277,262

(22) PCT Filed: Feb. 10, 2022

(86) PCT No.: PCT/US2022/015911

§ 371 (c)(1),
(2) Date: Aug. 15, 2023

(87) PCT Pub. No.: WO2022/177798

PCT Pub. Date: Aug. 25, 2022

(65) Prior Publication Data

US 2024/0174938 A1 May 30, 2024

Related U.S. Application Data

(60) Provisional application No. 63/150,278, filed on Feb. 17, 2021.

(51) Int. Cl.
C10M 111/04 (2006.01)
C04B 35/565 (2006.01)
(Continued)

(52) U.S. Cl.
CPC ......... C10M 111/04 (2013.01); C04B 35/565 (2013.01); C04B 41/0072 (2013.01);
(Continued)

(58) Field of Classification Search
CPC .............. C10M 111/04; C10M 103/02; C10M 103/06; C10M 107/44; C10M 177/00;
(Continued)

(56) References Cited

U.S. PATENT DOCUMENTS

| 5,538,649 A | 7/1996 | Demendi et al. |
| 5,909,878 A | 6/1999 | Schrufer et al. |
(Continued)

FOREIGN PATENT DOCUMENTS

| CN | 102627993 A | 8/2012 |
| CN | 104989729 A | 10/2015 |
(Continued)

OTHER PUBLICATIONS

Babuska et al., "Understanding Friction in MoS2 , Part 1: Stress, Time and Temperature", Sandia National Laboratories; 15 pages.
(Continued)

*Primary Examiner* — Gilbert Y Lee

(74) *Attorney, Agent, or Firm* — CANTOR COLBURN LLP

(57) ABSTRACT

A dry gas seal assembly for use with a rotating machine that includes a rotating shaft, the seal assembly comprises a seal face bears a solid coating comprising molybdenum disulfide, graphene oxide, and optionally polydopamine, preferably wherein the graphene oxide to molybdenum disulfide ratio is 8:10 to 10:8. A method for making a dry gas seal assembly comprises coating a homogeneous dispersion of graphene oxide and molybdenum disulfide on a seal face.

20 Claims, 3 Drawing Sheets

(51) Int. Cl.

| | |
|---|---|
| *C04B 41/00* | (2006.01) |
| *C04B 41/45* | (2006.01) |
| *C04B 41/48* | (2006.01) |
| *C04B 41/50* | (2006.01) |
| *C04B 41/83* | (2006.01) |
| *C04B 41/87* | (2006.01) |
| *C10M 103/02* | (2006.01) |
| *C10M 103/06* | (2006.01) |
| *C10M 107/44* | (2006.01) |
| *C10M 177/00* | (2006.01) |
| *F16J 15/3284* | (2016.01) |
| *C10N 20/06* | (2006.01) |
| *C10N 40/34* | (2006.01) |
| *C10N 50/02* | (2006.01) |
| *C10N 70/00* | (2006.01) |

(52) U.S. Cl.
CPC ........ *C04B 41/4543* (2013.01); *C04B 41/488* (2013.01); *C04B 41/5001* (2013.01); *C04B 41/5054* (2013.01); *C04B 41/83* (2013.01); *C04B 41/87* (2013.01); *C10M 103/02* (2013.01); *C10M 103/06* (2013.01); *C10M 107/44* (2013.01); *C10M 177/00* (2013.01); *F16J 15/3284* (2013.01); *C10M 2201/0413* (2013.01); *C10M 2201/0663* (2013.01); *C10M 2217/0403* (2013.01); *C10N 2020/06* (2013.01); *C10N 2040/34* (2013.01); *C10N 2050/02* (2013.01); *C10N 2070/00* (2013.01)

(58) Field of Classification Search
CPC .. C10M 2201/0413; C10M 2201/0663; C10M 2217/0403; C04B 35/565; C04B 41/0072; C04B 41/4543; C04B 41/488; C04B 41/5001; C04B 41/5054; C04B 41/83; C04B 41/87; C10N 2020/06; C10N 2040/34; C10N 2050/02; C10N 2070/00; F16J 15/3284; F16J 15/34; F16J 15/3404; F16J 15/3412; F16J 15/3436
See application file for complete search history.

(56) References Cited

U.S. PATENT DOCUMENTS

| | | | |
|---|---|---|---|
| 5,909,879 A | 6/1999 | Simpson | |
| 5,989,511 A | 11/1999 | Gruen et al. | |
| 8,222,190 B2 | 7/2012 | Zhamu et al. | |
| 9,556,960 B2 | 1/2017 | Thelke et al. | |
| 9,841,107 B2 | 12/2017 | Otschik et al. | |
| 9,914,152 B2 | 3/2018 | Beckford et al. | |
| 11,155,762 B2 | 10/2021 | Sumant et al. | |
| 11,441,097 B2 * | 9/2022 | Sumant ................ | C10M 171/06 |
| 2005/0042161 A1 | 2/2005 | Carlisle et al. | |
| 2010/0269558 A1 * | 10/2010 | Morales ............... | C10M 103/00 |
| | | | 72/42 |
| 2014/0023864 A1 | 1/2014 | Sumant et al. | |
| 2014/0142007 A1 | 5/2014 | Lim et al. | |
| 2015/0197701 A1 | 7/2015 | Sumant et al. | |
| 2015/0367381 A1 | 12/2015 | Sumant et al. | |
| 2016/0091094 A1 * | 3/2016 | Devitt ................. | F04D 29/0513 |
| | | | 277/401 |
| 2018/0038488 A1 * | 2/2018 | Matheidas ........... | F16J 15/3492 |
| 2018/0223208 A1 | 8/2018 | Sumant et al. | |
| 2019/0039028 A1 | 2/2019 | Wanunu et al. | |

FOREIGN PATENT DOCUMENTS

| | | |
|---|---|---|
| CN | 106398802 A | 2/2017 |
| CN | 108251195 A | 7/2018 |
| JP | 2012037035 A | 2/2012 |
| RU | 2310777 C2 | 11/2007 |
| WO | 2007147508 A1 | 12/2007 |
| WO | 2010125059 A1 | 11/2010 |
| WO | 2011081538 A1 | 7/2011 |
| WO | 2012046069 A1 | 4/2012 |
| WO | 2017032985 A1 | 3/2017 |

OTHER PUBLICATIONS

Berman et al., "Macroscale superlubricity enabled by graphene nanoscroll formation", Science, vol. 348, Issue 6239, 2015; 6 pages.

Berman et al., "Operando tribochemical formation of onion-like-carbon leads to macroscale superlubricity", Nature Communications, vol. 9, 2018; 9 pages.

Wu et al., "Tribological behavior of WC/DLC/WS2 nanocomposite coatings", Surface & Coatings Technology, vol. 188-189, 2004; pp. 605-611.

Buckley, "Friction, Wear, and Lubrication in Vacuum", NASA Lewis Research Center, Library of Congress Catalog Card No. 72-174581; 95 pages.

Cumings et al., "Low-Friction Nanoscale Linear Bearing Realized from Multiwall Carbon Nanotubes", Science, vol. 289, Jul. 28, 2000; 4 pages.

Dienwiebel et al., "Superlubricity of Graphite", Physical; Review Letters, vol. 92, No. 12, Mar. 26, 2004; 4 pages.

Erdemir et al., "Synthesis and Tribology of Carbide-Derived Carbon Films", Int. J. Appl. Ceram. Technol., vol. 3, No. 3, 2006; pp. 236-244.

Fundus et al., "Diamond Like Carbon Coatings-Tribological Possibilities and Limitations in Applications on Sintered Silicon Carbide Bearing and Seal Faces", Proceedings of the 14th International pump users symposium; 6 pages.

Gesche et al., "Dry gas seals for low and high pressure", Sealing Technology, No. 9; 5 pages.

Hamilton et al., "A Possible Linmk Between Macroscopic Wear and Temperature Dependent Friction Behaviors of MoS2 Coatings", Tribol Lett., vol. 32, 2008; pp. 91-98.

International Search Report and Written Opinion for International Application No. PCT/US2013/051121, Date of Completion: Oct. 11, 2013; 8 pages.

International Search Report and Written Opinion for the corresponding International Application No. PCT/US2022/015911, International Filing Date: Feb. 10, 2022; Date of Mailing: Jul. 6, 2022; 13 pages.

Kanazawa et al., "Studies of Friction in Grease-Lubricated Rolling Bearings Using Ball-on-Disc and Full Bearing Tests", Tribology Transactions, vol. 63, No. 1, 2020; pp. 77-89.

Yu et al., "Graphene segregated on Ni surfaces and transferred to insulators", Applied Physics Letters, vol. 93, 2018; 4 pages.

Khare, H. et al.; "The Effects of Environmental Water and Oxygen on the Temperature-Dependent Friction of Sputtered Molybdenum Disulfide"; Tribology Letters, vol. 52, Issue No. 3; 2013; pp. 485-493; DOI: 10.1007/s11249-013-0233-8.

Kim et al., "Chemical Vapor Deposition-Grown Graphene: The Thinnest Solid Lubricant," ACS NANO, vol. 5, No. 6, 2011; pp. 5107-5114.

Kimura et al., "Boron nitride as a lubricant additive", Wear, vol. 232, 1999; pp. 199-206.

Lee et al., "Frictional Characteristics of Atomically Thin Sheets", Science, vol. 328, Apr. 2, 2010; 6 pages.

Liu et al., "Observation of Microscale Superlubricity in Graphite", Physical Review Letters, vol. 108, 2012; 5 pages.

Novoselov et al., "Electric Field Effect in Atomically Thin Carbon Films", Science, vol. 306; Oct. 22, 2004; 5 pages.

Podgornik et al., "Tribological behaviour and lubrication performance of hexagonal boron nitride (h-BN) as a replacement for graphite in aluminium forming", Accepted Manuscript, Accepted Date: Sep. 11, 20147; 34 pages.

Singh et al., "Fatigue resistant carbon coatings for rolling/sliding contacts", Tribology International, vol. 98, 2016; pp. 172-178.

Singhbabu et al., "Efficient anti-corrosive coating of cold-rolled steel in a seawater environment using an oil-based graphene oxide ink", Nanoscale, vol. 7, 2015; 13 pages.

(56) References Cited

OTHER PUBLICATIONS

Stankovich et al., "Synthesis of graphene-based nanosheets via chemical reduction of exfoliated graphite oxide", Carbon, vol. 45, 2007; pp. 1558-1565.

Sumant et al., "Ultrananocrystalline Diamond Film as a Wear-Resistant and Protective Coating for Mechanical Seal Applications", Tribiology Transactions, vol. 48, 2005; pp. 24-31.

Tran, "Surface Metrology: Stylus and white light interferometry", Sandia National Laboratories, May 3, 2012; 32 pages.

Wu et al., "Experimental analysis of tribiological properties of lubricating oils with nanoparticle additives", Elsevier, Wear, vol. 262, 2007; pp. 819-825.

European Search Report for Application No. 22756718.7, mailed Jan. 13, 2025, 11 pages.

* cited by examiner

LOW FRICTION COATINGS

CROSS REFERENCE TO RELATED APPLICATIONS

This is a U.S. National Stage of Application No. PCT/US2022/015911, filed Feb. 10, 2022, which claims the benefit of U.S. Provisional Application No. 63/150,278, filed Feb. 17, 2021, the disclosures of which are incorporated herein by reference.

STATEMENT OF GOVERNMENT INTEREST

This invention was made with government support under Contract No. DE-AC02-06CH11357 awarded by the United States Department of Energy to UChicago Argonne, LLC, operator of Argonne National Laboratory. The government has certain rights in the invention.

BACKGROUND

In design, manufacture, and operation of moving mechanical assemblies ("MMAs"), there is frequently an aim to reduce and/or achieve high lubricity (very low coefficients of friction) at engineering scales. MMAs include a variety of motion schemes, such as ball bearing, disk on surface, and rotating shafts interactions. The low friction regime is attractive in many of these applications because it would provide the high levels of savings in energy, environment, and money. Coefficients of friction (COF) of above 0.01 to 0.1 are considered low friction and above that transition to high friction. Generally, COF of less than 0.01 are considered superlow and hence fall in the superlubric regime. Such levels of friction coefficients are typical of those surfaces that are either aero- or hydro-dynamically separated or magnetically levitated where little or no solid-to-solid contact takes place. Under sliding regimes where direct metal-to-metal contacts prevail and high contact pressures are present, achieving low friction is difficult due to the concurrent and often very complex physical, chemical, and mechanical interactions taking place at sliding surfaces.

In addition, some applications that would require or benefit from low friction also have non-ideal environments for low friction. For example, mechanical shaft seals, such as dry gas seals or non-contacting seals, used in pumps, turbines, and centrifugal compressors are critically important components, which are used in many industries, from paper, pulp, and chemicals to petroleum, oil exploration, and power-generating plants. These shaft seals prevent product leakage from rotating equipment. Friction- and wear-related mechanical failures remains one of the greatest challenges in such pumps and compressors, and therefore the search for new materials, coatings, and lubricants that can reduce such failures continues worldwide. Dry gas seals operate by providing a seal between two rings, at least one of which can rotate relative to the other. In general, one of the rings (referred to as seal ring or primary ring) is axially movable and can be urged by a compression spring or a bellows into face-to-face contact with the other ring, the mating ring, which is fixed against axial movement. Depending on the configuration, one of the seals or mating rings is mated to the rotating shaft/rotor of the rotating machine and rotates with it. The rotating ring (mating ring) can be mated to the rotor via a shaft sleeve.

In operation, a layer of gas is developed between the two rings that forms a seal while allowing the rings to move relative to one another without contacting each other. The gas layer is formed from process or sealing gas injected into the dry gas seal.

These systems can rely upon the motion of the components to establish a gas layer between the elements that serves as part of the seal function. However, during use, particularly at lower rotation speeds, the solid components (e.g. the rings) may contact each other. Thus, having durable, low friction coatings on the facing moving components can be desirable. Some existing technologies rely upon a diamond-like carbon ("DLC") coating as a solid lubricant. In particular, silicon carbide ("SiC") is the leading material for high pressure (>10 MPa) dry gas seal applications. These seals are standard in applications like oil and gas drilling, but friction between SiC—SiC surfaces creates high heat and pressure, which can cause wear that leads to downtime. Standard methods of reducing this wear include application of DLC or carbon-derived coatings on these surfaces. Deposition of these coatings can be time and capital-intensive. The range of speed, temperature, and operating conditions creates additional challenges for sealing these surfaces. However, challenges with such lubricant systems exist, including the need for the DLC coating and the failure of the lubricant system to remain bound to one or both of the respective rotating ring (mating ring) and/or primary ring. A need thus remains for a lubricant system for dry gas seals that can be readily applied, provide good lubricity, and/or provide long lasting lubricity.

SUMMARY

Disclosed herein is a method useful in forming a low friction, wear-resistant seal assembly. The method comprises providing seal assembly components comprising a seal face substrate, suspending molybdenum disulfide in a carrier liquid to form a mixture; adding graphene oxide to the mixture, preferably at a graphene oxide to molybdenum disulfide weight ratio of 8:10 to 10:8; optionally adding polydopamine to the mixture (e.g. at a concentration of from 0.01 to 0.2 or from 0.02 to 0.1 mg polydopamine/ml of mixture, preferably 0.02 mg/ml to 0.09 mg/ml); forming a homogenous mixture of molybdenum disulfide, graphene oxide, and optional polydopamine (e.g. by sonicating); and disposing the homogeneous mixture on the substrate. The homogenous mixture can be disposed by spraying the homogeneous mixture on a silicon carbide substrate via a process of air-spray coating, forming a wet film on the substrate, and evaporating the carrier liquid to form a dry coating layer.

Also disclosed herein is a seal assembly for use with a rotating machine that includes a rotating shaft. The seal assembly can be a non-contacting seal or a dry gas seal. The seal assembly comprises a substrate and a wear-resistant surface coating on the silicon carbide substrate, the wear resistant surface coating comprising molybdenum disulfide, graphene oxide, and, optionally polydopamine, wherein the graphene oxide to molybdenum disulfide weight ratio is preferably 8:10 to 10:8. For instance, the dry gas seal assembly can comprise: a mating ring having a mating ring seal face; a primary ring having a primary ring seal face; where the mating ring and primary ring are positioned such that the mating ring seal face and primary ring seal face are adjacent and facing each other; a first biasing member that urges the primary ring seal face toward the mating ring seal face; wherein at least one of the mating and primary ring seal faces includes recesses formed thereon that cause a gas to be drawn between the mating ring and the primary ring due to relative rotation between the primary ring and the mating ring and form a gas layer between the mating ring and the primary ring that urges the primary ring away from the mating ring; wherein at least one of the mating ring seal face and the primary ring seal face bears a solid coating comprising molybdenum disulfide, graphene oxide, and optionally polydopamine, preferably wherein the graphene oxide to molybdenum disulfide ratio is 8:10 to 10:8.

Further disclosed herein is a method of forming a low friction wear surface comprising: disposing over a substrate a solution comprising nanodiamonds and a 2D material selected from the group consisting of $MoS_2$ and h-BN to form a first sliding component; sliding the first sliding component against a second sliding component having a diamond-like carbon on a sliding surface; forming scrolls of the material around the nanodiamonds; and converting the scrolled nanodiamonds into nano-onions.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1A:
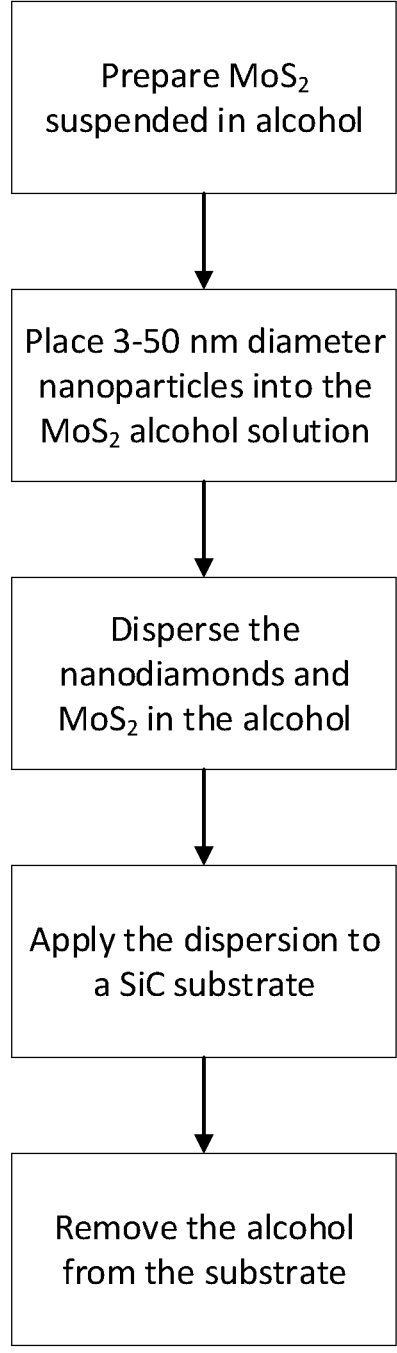
FIG. 1A is a schematic flow diagram of an example method for forming a low friction wear surface including molybdenum disulfide ("$MoS_2$") and nanodiamonds ("ND")

Following below are more detailed descriptions of various concepts related to, and embodiments of, inventive low friction and wear-resistant graphene containing surfaces. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Superlubricity is defined as a regime of motion in which friction vanishes or nearly vanishes, such as a COF of less than about 0.01. The superlubric friction is measured by sliding the low friction, wear-resistant surface using a ball-on-disc configuration of wear testing, under unidirectional sliding. The coated substrates as described herein can achieve very low coefficient of friction which can approach (and potentially achieve) superlubricity.

Generally speaking, the various aspects described herein include a low friction or super low friction, wear-resistant surface which comprises a substrate bearing a coating of 2-D materials. As used herein 2-D means crystalline materials having a single layer, two layers or three layers of atoms, preferably a single layer of atoms. The 2-D materials can comprise molybdenum disulfide and graphene oxide (MoSGO). The molybdenum disulfide can be a very thin flake like particle. For example, the molybdenum disulfide can be a single layer or a few-layers produced for example through exfoliation. The graphene oxide can also be a flake, preferably also a monolayer flake. The MoSGO can be utilized as a solid lubricant for the substrate. The substrate can be silicon carbide (SiC). Alternatively, the substrate can comprise the molybdenum disulfide in combination with nanodiamonds (MoSND). The resultant surface(s) can exhibit very low coefficients of friction at elevated temperatures (e.g., 100° C.) and under high loads (e.g., above 200 MPa to a maximum of 1 GPa contact pressures). MoSND.

Where the coating comprises $MoS_2$ with nanodiamonds as a lubricant for rotating substrates, particularly silicon carbide (SiC) substrates, carbon nano-onions can be formed during interaction of the lubricant with the substrates as the sliding interfaces. A solution-processed material ($MoS_2$) can be prepared by chemical and/or mechanical exfoliation or the like and then suspended in an alcohol (e.g., ethanol). Diamond nanoparticles (i.e., nanodiamonds) of 3-50 nm diameter are placed into the solution in the proportion of 50-1000 mg of nanodiamonds per 1 L of solution. The resulting solution may be sonicated, such as in a sonicator bath, for 20-30 minutes to ensure good dispersion of the material and nanodiamond in alcohol. The nanodiamond and $MoS_2$ solution are then mixed such as by sonication and applied to the SiC material, such as by spraying or drop casting.

Experiments achieved ultralow steady state friction and low wear in the case of SiC paired against DLC in presence of MoSND even after 3600 meters of sliding (120 min). Whereas, in case of DLC/DLC with MoSND, the friction and wear were steady, and the disc wear depth was reduced by a factor of 3. We have conducted the tests at macroscale and under high load and high-speed conditions that are relevant to gas seal applications. Further, following the initial evaluation of the solid lubricant, the lubricant was tested for its ability to reduce torque, and we observed 80% reduction in dry nitrogen atmosphere along with 50% reduction in wear. Moreover, the solid lubricant was able to run under ambient air conditions and resulted in 85% torque reduction. For example, COF for DLC coated SiC against an uncoated SiC showed significant coating wear after about 45 minutes with resulting increase in coefficient of friction to 0.4 and to even more than 0.5 from an initial level of about 0.014. In contrast, the COF of DLC coated SiC against a SiC substrate having an MoSND coating stayed steady at about 0.013-0.014 for the duration of the test. Ball wear with the MoSND coating was three orders of magnitude less than without the coating.

The friction plot indicates immediate action of MoSND and steady state ultralow friction is maintained. In case of baseline tests without MoSND, coating wear on the disc is observed and large wear is noticed along with large friction coefficient. Analysis of Raman spectroscopy and microscope images confirms that MoSND helps in maintaining the integrity of the SiC/DLC system along with imparting low friction and wear.

DLC/DLC materials pairs were tested with MoSND solid lubricant and it was deposited using two different methods: drop casting ("DPC") and spray coating ("SPC"). Friction and wear results showed steady state friction and wear on the ball. Further, the disc wear is reduced by 3 times or 66%.

DLC/DLC materials pair coated with MoSND solid lubricant was tested in a Disc-on-Disc configuration to understand its performance and observed that the torque and wear reductions were phenomenal in dry nitrogen and ambient air conditions. It was observed that MoSND performed well showing reduction in torque in dry nitrogen by 80% and in ambient air by 85%. However, the coating lasted for 4 hours for a total of 8 hours tests, indicating problems related to adhesion of the coating.

MoSGO.

The coating can be MoSGO. The process as disclosed herein can include forming a homogenous suspension, or dispersion of the constituent materials, e.g. the molybdenum disulfide ($MoS_2$) and the graphene oxide (GO), in a carrier liquid. The carrier liquid can be water or a polar solvent such as an alcohol (e.g. methanol, ethanol, etc.). The $MoS_2$ and GO can form a homogenous suspension in a range of weight ratios in between $(1\pm0.25):(1\pm0.25)$, (e.g., 8:10 to 10:8, including 10:10). The homogenous suspension can be disposed over or on a substrate. That substrate maybe at ambient temperatures (~20-22° C.), may be from ambient to 100° C. An elevated temperature above 200° C. is not required.

The suspension processing can occur at the temperature of the substrate. Water can be a carrier liquid or medium to deposit the homogenous suspension of $MoS_2$ and GO on to the substrate. It is believed that as perfectly spherical water droplets containing the solid nanomaterials impinge on to the superheated surface, they instantaneously evaporate with a miniature yet high energy explosion akin to cavitation. This transfers the entire solid materials on to the solid substrate as the liquid evaporates. This high activation energy contained in the small water-droplet system forces the solid particles together. The deposition can occur, for example, by spraying the suspension on the substrate.

Since the two phases ($MoS_2$ and GO) can be in equal or near-equal proportions in a homogenous suspension, without wishing to be bound it is believed they eventually can form layered structure where the $MoS_2$ layer is encapsulated or at least partially encapsulated in the graphene oxide. Specifically, with regard to the lower end-point of the temperature range, the boiling point of the carrier liquid (100° C. in this case), amount of solid phases present (such as 2 g/L), and the droplet size are believed to impact the minimum temperature at which this occurs. Notably, the solid phases in the water drop act as impurities, as well as the impinging jet effectively eliminate Leidenfrost effect. The process may be carried out at atmospheric pressures and temperatures, that is exposed to oxygen (in the atmosphere) and at a temperature of about 20-22° C., contrary to the prior art requiring a dry, inert, or nitrogen environment. The disposing of the homogeneous solution on the substrate may be achieved by any suitable process, such as a spray casting or a solution processed method.

Figure 1B:
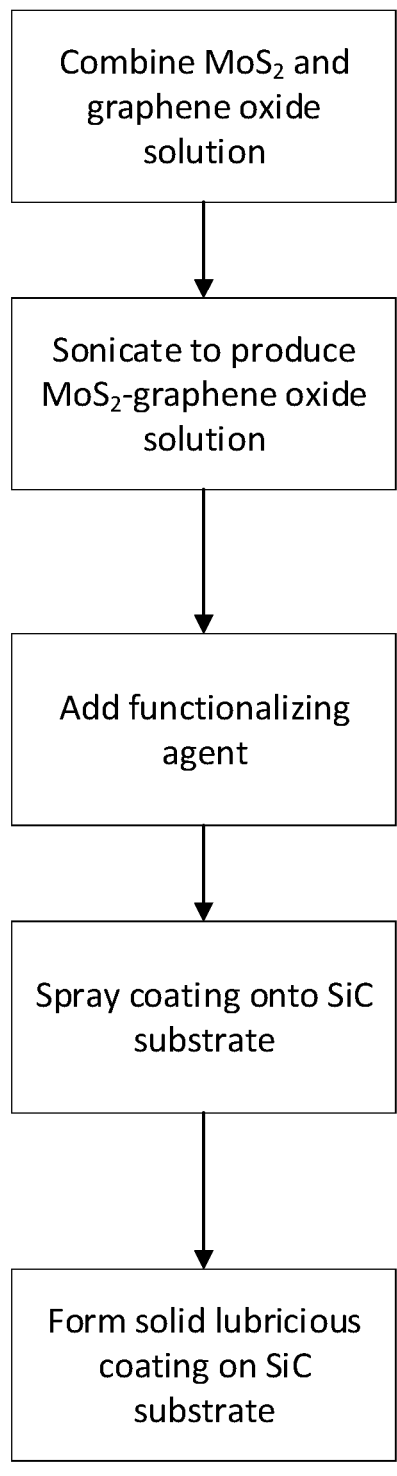
FIG. 1B is a schematic flow diagram of an example method for forming a low friction wear surface including molybdenum disulfide ("$MoS_2$") and graphene oxide ("GO").

FIG. 1b is a schematic flow diagram of an example method for forming a low friction wear surface including $MoS_2$ and GO. In this method, $MoS_2$ may be added to a container (e.g., a vial). The $MoS_2$ can be in the form of ultrafine nanocrystalline flakes. The average size (e.g.

length, width, diameter) of the $MoS_2$ flakes can be, for example, 300-500 nm and should be commensurate in size or be smaller than the size of the GO flakes. For example, the dispersion can have at least 1 g of $MoS_2$ ultrafine nanocrystalline flakes/liter (L) of carrier liquid (e.g. water) (e.g. 1-15 g/L). The $MoS_2$ powder can be a nanocrystalline in nature and does not have to be in flake or monolayer flake (i.e. 2-D) format to begin. It is believed that during the sliding process during operation, exfoliation of $MoS_2$ can occur, forming 2-D layers of $MoS_2$.

A GO suspension can be then added to the container at. The GO solution can have a concentration between 1-15 g/L for forming the lubricant. A carrier for the graphene oxide can be water or a polar solvent such as a lower alcohol. The GO solution may be obtained by exfoliating graphite and disposing the resulting graphene oxide flakes in a liquid. The graphene oxide can be prepared by exfoliation by any appropriate chemical or mechanical exfoliation process, such as chemical exfoliation of highly oriented pyrolytic graphite in the case of graphene. The carrier can be water or an aqueous solution with an oil-free solvent. In some embodiments, the GO will be suspended in water. An oil-free solution is more environmentally friendly, devoid of oil related hazards, and easy to strip after usage. In some embodiments, the coating may be easily removed by immersing the coated substrate into de-ionized water and sonicating for 3 minutes or instantaneously by pressure jet washing. In some embodiments, the GO is suspended in a carrier liquid to form a dispersion of at least 1 g GO/L of dispersion, preferably 5-10 g/L. The average size (e.g. length, width, diameter) of the GO flakes can be 1-5 microns. The thickness of the individual GO flakes can be 1 nm or less.

Ultra-low friction can be achieved with GO and $MoS_2$. It is believed that the ultra-low friction is facilitated by formation of encapsulating heterostructures and lower the overall shear strength of layered 2-D materials with increasing load. The incommensurate heterostructure of $MoS_2$ and GO lowers the shears strength during sliding. The shear strength of $MoS_2$ decreases with increasing load. $MoS_2$ alone can produce a friction as low as 0.04 at 100° C. when tested in ambient atmospheric conditions. See Hare & Burris, "The Effects of Environmental Water and Oxygen on the Temperature-Dependent Friction of Sputtered Molybdenum Disulfide," Tribology Letters 52(3), pp. 485-493 (2013). However, increase in temperature beyond 100° C. deteriorated lubricious properties due to rapid intercalation of $MoS_2$ films from oxygen and water, as evidenced by formation of $MoO_3$ compounds. It has been discovered that the addition of GO prevents such deleterious effects and prolongs the life of $MoS_2$ for longer durations. It has been observed that $MoS_2$ reorients the basal planes progressively, with increasing load and sliding velocity. These morphological changes are permitted by the protective graphene oxide layers that can protect $MoS_2$ from oxygen and vapor. In the absence of such a protection, some $MoS_2$ may eventually convert in to $MoO_3$ which would inhibit reorientation of $MoS_2$ needed to reduce friction and wear.

The method for forming the low friction wear surface can include sonicating the mixture of $MoS_2$ and GO and carrier in the container to form a homogeneous suspension. The mixture includes solid graphene-oxide sheets or flakes suspended in water to form a solid in a liquid suspension. It is believed that the solid $MoS_2$ can interact with solid GO sheets in the suspension via van-der-Waals forces. The interaction does not proceed by nucleation of $MoS_2$/GO from a saturated/supersaturated solution but rather evaporation of the carrier liquid and deposition of the solid materials onto the substrate. The deposition and instantaneous coating formation can be aided by a cavitation type explosion as the water droplet impinges on to the surface as discussed previously. Sonication may be done in any device capable of applying sound energy to agitate particles in a sample, for example, but not limited to an ultrasonic bath or an ultrasonic probe. In one embodiment, the thin layers are mixed by sonication, "sonixing." It is believed that physical agitation will not provide the necessary agitation for the materials to mix homogenously. However, the sonixing did not indicate any material modification of the parent phases. For example, the d-spacing of $MoS_2$ and GO have remained same after sonication.

The $MoS_2$ and GO can be introduced onto the surface via a process of air spray-coating by spraying the suspension (with a solvent such as water) over the substrate and then evaporating the solvent. In one embodiment, the coating can be applied using any technique that produces a mist. The mist droplets must contain the two components in suspension. Alternatively, any physical deposition techniques wherein a carrier liquid is used to deliver the solid materials and the carrier liquid, but not require a chemical reaction, can evaporate without physically altering/changing/damaging $MoS_2$ and GO can be used. Such deposition differs from those remaining in solution, such as graphene suspended in oil, or those applied chemically. For example, those materials in solution are, obviously, in solution and not bound to the substrate surface (e.g., flowable oil with suspended particles). In contrast, solid materials that have been deposited as by spraying will not be in solution, rather such materials will be controlled by Van der Waals forces to attach the materials to the substrate. Further, there is also a structural difference between such materials and those formed as a solid on the surface of the substrate by chemical vapor deposition, atomic layer deposition, or the like. In such instances, the material is reacted (covalently bonded) with or chemisorbed to the substrate rather than merely held by Van der Waals forces. The thickness is controlled by altering the samples' exposure time to the mist. The pressure/flowrate can also effectively be used to change the amount of solid-bearing liquid carrier impinged on to the surface.

The suspension can include a functionalizing agent. The functionalizing agent could function to improve the adhesion of the coating and durability. Examples of such adhesion improving functionalizing agents are polydopamine (PDA). For example, an adhesion improving functionalizing agent (e.g. PDA) can be added to the suspension at a concentration of 0.01, or 0.02 up to 0.2, or 0.1 or 0.09 mg/ml (e.g. 0.022 mg/ml in a carrier liquid, such as ethanol, prior to solution processing). In one embodiment, PDA at a concentration of 0.042 mg/ml was added to the dispersion of the MoSGO solid lubricant such that the end concentration of MoSGO is approximately 1.021 mg/ml (such as 1 mg/ml+ 10%). It is believed that this type of functionalizing agent is working as a binding agent between the nanoparticles and the substrate surface. In one embodiment, the process includes forming a polymer solution. Other functionalizing agents could enhance lubricity. Examples of such alternative functionalizing agents are polytetrafluoroethylene ("PTFE"), and/or polyether ether ketone ("PEEK"). One or more functionalizing agents can be used in combination.

The thickness of the coating effective to produce (and maintain over time of usage) high lubricity (low coefficient of friction) properties depends on the usage as would be appreciated in the art. For example, lower test loads transition into very high lubricity regime more easily such that thinner coatings are sufficient, whereas thicker coatings can be required at higher loads and for longer sliding distances. A single coating layer can be used. Alternatively, subsequent coats can be applied after the initial layers have completely dried and have adhered to the substrate firmly. The thickness of the coating can be 0.5 to 2.5 micron. Also, use of an adhesion promoting functionalizing agent (e.g. PDA) is useful in a first layer to improve the adhesion of the coating to the substrate (e.g. SiC surface). Subsequent layers can comprise MoSGO without the adhesion promoting functionalizing agent. Alternatively, an adhesion promoting functionalizing agent could be used in each layer.

In some embodiments, the method of forming the low friction wear surface includes evaporating the solvent component and encapsulating or partially encapsulating the $MoS_2$ flakes in GO in one step (i.e., by simultaneous evaporation and consequent encapsulation). Encapsulating or partially encapsulating the $MoS_2$ flakes greatly helps the longevity and lubricity of the low friction wear surface because the flakes are passivated from or protected from ambient oxygen and moisture, such as by increasing the effective usage temperature range of the $MoS_2$ flakes to up to about 250° C. The $MoS_2$ flakes can be fully encapsulated or coated with the graphene oxide or can be partially encapsulated or coated with the graphene oxide. The higher density of the $MoS_2$ enables such full encapsulation with a substantially equal weight of the less dense graphene oxide. This is ensured by virtue of the composition (wt %) of the two phases chosen. Also, this coating process can be used on large surfaces. The coating process can be used on surfaces that are not flat—e.g. patterned, textured, curved, containing recesses or projections, etc. A large-scale application of such can utilize a scanning spray nozzle to cover a large area with the graphene in solution and then vaporize the solvent.

The surface of the substrate can have a surface roughness. For example, the surface roughness, Ra, can be at least 0.1 as measured for example by ISO 4288-1996 using commercially available profilometer, such as by Taylor-Hobson® Talysurf i120. The surface roughness can be 0.05-0.4, or 0.05-0.25, or 0.1 to 0.4, or 0.1 to 0.25, or 0.2-0.4. The surface roughness can facilitate adhesion of the coating to the surface. Too high a surface roughness can degrade performance and durability over time. In case of extremely smooth substrates, the surfaces can be treated to make them amenable to the deposition techniques. Examples of such treatments include, but are not limited to, ozone treatment and doping with binders that make bonds between the substrate (e.g. Silicon carbide) and the initial layers and higher substrates (up to 400° C.) temperatures.

The substrate can comprise silicon carbide (SiC), Tungsten carbide, Boron nitride, or Silicon nitride. The substrate, (e.g. SiC) can be part of a gas seal. In experimental testing, the resultant MoSGO material achieved ultralow steady state friction and low wear in case of self-mated uncoated SiC (SiC vs SiC) and also SiC paired against DLC in presence of MoSGO at high load and high speed pin-on-disc ("POD") tests. In one embodiment, the deposited MoSGO is utilized with an opposing wear face of MoSGO, in other embodiments the opposing wear face is DLC.

For example, experiments to determine coefficient of friction (COF) and wear for a silicon carbide disc substrate having a coating of $MoS_2$ with graphene oxide ("MoSGO") sliding against a diamond like coating (DLC) coated SiC ball for 120 minutes at forces and speeds consistent with those in gas seal applications. Two suspensions of the $MoS_2$ and GO were prepared in water and ethanol and coated onto the Silicon carbide substrate. The COF was 0.019-0.02 for the coated substrates as compared to 0.715 for the uncoated substrate—a reduction of 35-38 times as compared to sliding the DLC coated SiC ball on the uncoated substrate. Ball wear was reduced by 4-5 orders of magnitude as compared to sliding the DLC coated SiC ball on the uncoated substrate. Disc wear was reduced by 6 times as compared to sliding the DLC coated SiC ball on the uncoated substrate.

A similar experiment using an uncoated SiC ball showed COF reduction of 16 times, (0.043 for the coated substrate as compared to 0.697 for the uncoated substrate). While disc wear reduction of 16 times and ball wear of reduction of 3-4 times were observed as compared to an uncoated substrate.

Friction plots indicate immediate action of MoSGO and steady state ultralow friction is maintained. In case of baseline tests without MoSGO, coating wear on the disc is observed and large wear is noticed along with large friction coefficient. Further, following the initial evaluation of the solid lubricant MoSGO on SiC, the lubricant was tested for its ability to reduce torque. The solid lubricant adhesion was observed to not be optimal.

Additional experiments where the suspension includes PDA and the coating is tested by sliding against an uncoated SiC ball showed the COF was reduced by 22 times (0.032 vs 0.697) and disc wear was reduced by 25 times as compared to an uncoated substrate Further, disc on disc tests were run where a disc surface is rotated relative to another disc surface (disc on disc test). Torque is measured rather than coefficient of friction. Specifically, a mat-lapped silicon carbide mating ring was rotated relative to a mat-lapped silicon carbide primary ring, bearing a MoSGO lubricant coating modified with PDA in dry nitrogen. A reduction in torque of 84% was observed in dry nitrogen and of 60% in ambient air.

In another test, both a mat-lapped mating ring and a polished (i.e. smooth) primary ring were coated with an MoSGO coating and a disc on disc test. After the test, inspection of the wear tracks by scanning electron microscope and Raman spectroscopy revealed that the polished surface no longer included the MoSGO lubricant while the mat lapped surface retained the MoSGO layer. Mat lapped surface roughness is about 0.15 Ra. Polished surface is about 0.055 Ra.

Combinations

The MoSGO coating can be used in combination with another coating. For example, an opposing surface can have a diamond like coating (DLC). A particular coating including nanodiamonds can comprise $MoS_2$ with nanodiamonds (MoSND) as a lubricant for the substrate, e.g. a SiC substrate in rotational facing with a substrate coated with MoSGO. Carbon nano-onions can be formed during interaction of the lubricant with the substrates as the sliding interfaces. To form the MoSND coating, a solution-processed material ($MoS_2$) can be placed into a solution in the proportion of 50-1000 mg of nanodiamonds per 1 L of solution applied to the SiC material, such as by spraying or drop casting.

Seal Assembly

As noted, the coatings disclosed herein can be used in dry gas seal or non-contacting seal applications.

Figure 2:
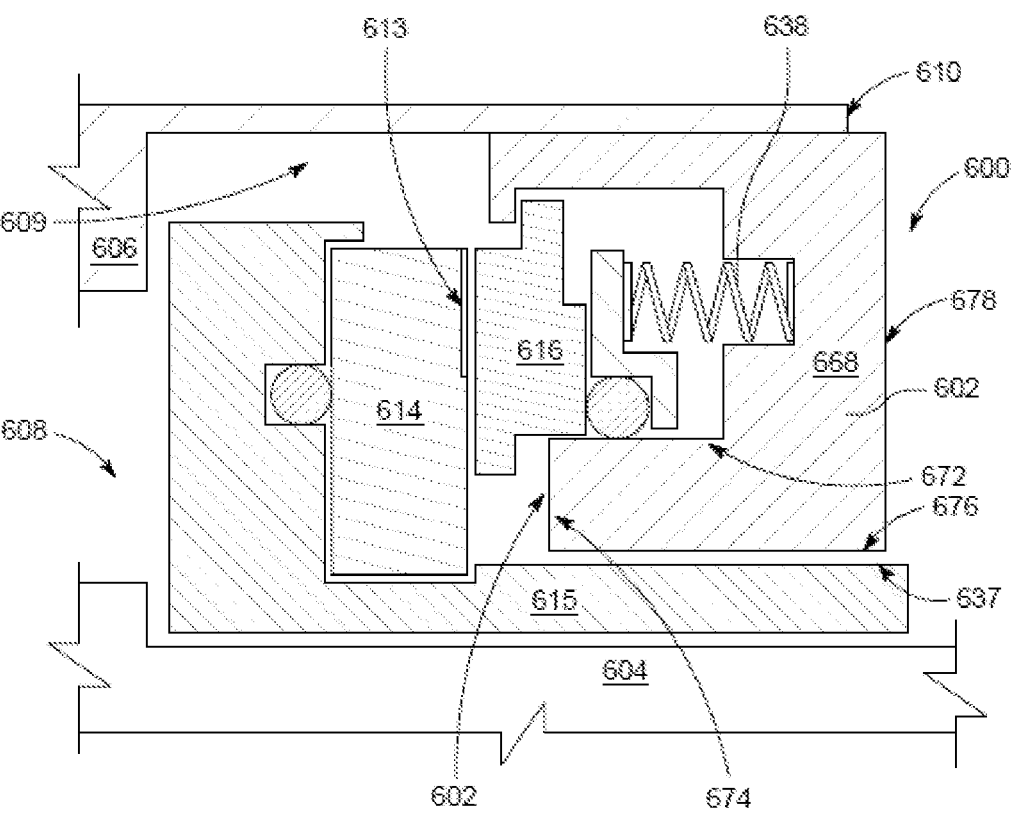
FIG. 2 is a cross section view of a portion of one example of a seal assembly of a dry gas seal.

For Example, FIG. 2 shows a cross-section of a seal assembly 600 that can be placed between a rotating shaft 604 and a housing 606 with an outer wall 610 and a bore 609. The seal assembly includes a mating ring 614 with a mating ring seal face adjacent to and facing a primary ring seal face of a primary ring 616. At least one of the mating ring seal face and the primary ring seal face bear a coating comprising molybdenum disulfide and nanodiamonds or comprising molybdenum disulfide and graphene oxide as described herein.

The seal 600 is shown as a single seal configuration but it shall be understood that the seal assembly 600 could be used in combination with another seal form a dual dry gas seal assembly.

The seal assembly 600 can operate by developing a layer of gas between the mating ring seal face and the primary ring seal face due to relative motion between the mating ring 614 and the primary ring 616. In particular, the layer of sealing gas can keep gas within a chamber 608 from escaping therefrom along a shaft 604. The seal assembly 600 can also optionally include a biasing member 638 that urges the primary ring 616 towards the mating ring 614. One of the mating ring seal face and the primary ring seal face can comprise a surface feature textured area (e.g. recesses) such that the rotation of the rings relative to one another facilitates a sealing gas to reside between the faces. The surface texture features can be configured such that they draw gas in from an outer diameter of one of the faces towards it center/inner diameter. Such a configuration is applicable to situations where pressure at the outer diameter is greater than at the inner diameter. In the opposite case (e.g., where the pressure is higher at the inner diameter), the surface texture patterns an extend outwardly from the inner diameter to the outer diameter.

There can be coating on only one of the seal faces or on both of the seal faces. The coating on each seal face can be the same or different. For example, the coating on one seal face can comprise molybdenum disulfide and graphene oxide and optionally a functionalizing agent such as polydopamine (MoSGO) as described herein while the other seal face can be uncoated, coated with nanodiamonds, coated with MoSND, or coated with molybdenum disulfide and graphene oxide and optionally a functionalizing agent such as poly dopamine.

The seal assembly 600 can also include a sleeve ring 615 that can be mated to the rotating shaft 604 that enables the mating ring 614 to rotate with the shaft 604. The mating ring seal face can include grooves thereon. The seal assembly 600 can include an optional retainer 602 with a body 668 and surfaces 672, 674, 676, 678.

The MoSND or MoSGO coating can be applied to a seal face after formation of the texture (i.e. recesses) in the seal face. Alternatively, the coating can be applied to the seal face and then the seal face etched to form recesses.

Definitions

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." Any ranges cited herein are inclusive.

The terms "substantially" and "about" used throughout this specification are used to describe and account for small fluctuations. For example, they may refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" may refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising." "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention includes the following Aspects:

Aspect 1: A method of forming a low friction, wear-resistant seal assembly comprising: providing seal assembly components comprising a seal face substrate; suspending molybdenum disulfide in a carrier liquid to form a mixture; adding graphene oxide to the mixture, preferably at a graphene oxide to molybdenum disulfide weight ratio of 8:10 to 10:8; forming (e.g. through sonicating) a homogenous mixture of molybdenum disulfide, graphene oxide, and, optionally, polydopamine; and depositing the homogeneous mixture on a portion of the seal face substrate, forming a wet film on the seal face substrate, and evaporating the carrier liquid to form a dry coating layer.

Aspect 2: The method of Aspect 1 further comprising adding polydopamine to the mixture, preferably in an amount of 0.01 to 0.2, more preferably 0.02 to 0.1, still more preferably 0.02 to 0.09 and most preferably 0.022 to 0.088, mg poly dopamine/ml of mixture.

Aspect 3: The method of Aspect 1 or 2 wherein providing seal assembly components includes providing a mating ring having a mating ring seal face and a primary ring having a primary ring seal face; wherein the depositing on the seal face substrate comprises depositing on at least one of the mating ring seal face and the primary ring seal face.

Aspect 4: The method of Aspect 3 further comprising, after forming the dry coating layer, arranging the mating ring and the primary ring in housing.

Aspect 5: The method of Aspect 3 or 4 wherein the arranging comprises arranging the mating ring with the mating ring seal face adjacent to and facing the primary ring seal face.

Aspect 6: The method of any one of the preceding Aspects, wherein the carrier liquid comprises water, an alcohol, or both.

Aspect 7: The method of any one of the preceding Aspects, wherein the homogenous mixture is oil-free.

Aspect 8: The method of any one of the preceding Aspects, wherein depositing comprises spray coating.

Aspect 9: The method of any one of the preceding Aspects wherein the seal face substrate comprises silicon carbide.

Aspect 10: The method of any one of the preceding Aspects, wherein the disposing the homogenous mixture is on the seal face substrate at between 20° C. and 100° C., preferably at ambient temperature.

Aspect 11: The method of any one of the preceding Aspects, wherein the suspended molybdenum disulfide comprises flakes having a dimension perpendicular to thickness of 300-500 nm.

Aspect 12: The method any one of the preceding Aspects, wherein the suspended graphene oxide are graphene oxide flakes, preferably having a dimension perpendicular to thickness of 1-5 microns.

Aspect 13: The method of Aspect 12, wherein the suspended molybdenum disulfide flakes are smaller than the graphene oxide flakes.

Aspect 14: The method of any one of the preceding Aspects, wherein the substrate, prior to disposing the homogenous mixture has a surface roughness, Ra, of 0.05 to 0.4, preferably 0.1 to 0.25 or 0.2 to 0.4, as measured by ISO 4288-1996.

Aspect 15: The method of any one of the preceding Aspects where a second coating of the homogeneous mixture is applied on the dry coating layer.

Aspect 16: The method of Aspect 15 wherein the homogeneous composition deposited on the seal face substrate includes an adhesion promoting functionalizing agent, preferably poly dopamine.

Aspect 17: The method of aspect 16 wherein the second coating of the homogeneous mixture is free of adhesion promoting functionalizing agent.

Aspect 18: The method of anyone of the preceding Aspects wherein the seal face comprises grooves.

Aspect 19: The method of Aspect 18 wherein the depositing occurs on the seal face comprising grooves.

Aspect 20: The method of Aspect 18 wherein the grooves are etched in the seal face after the forming of the dry coating layer.

Aspect 21: A method of forming a low friction wear surface comprising: disposing over a substrate a solution comprising nanodiamonds and a 2D material selected from the group consisting of $MoS_2$ and h-BN to form a first sliding component; sliding the first sliding component against a second sliding component having a diamond-like carbon on a sliding surface; forming scrolls of the material around the nanodiamonds; and converting the scrolled nanodiamonds into nano-onions.

Aspect 22: A dry gas seal assembly made by the method of any one of claim.

Aspect 23: A dry gas seal assembly for use with a rotating machine that includes a rotating shaft, the seal assembly comprising: a mating ring having a mating ring seal face; a primary ring having a primary ring seal face; where the mating ring and primary ring are positioned such that the mating ring seal face and primary ring seal face are adjacent and facing each other; a first biasing member that urges the primary ring seal face toward the mating ring seal face; wherein at least one of the mating ring seal face and the primary ring seal face includes recesses formed thereon that cause a gas to be drawn between the mating ring and the primary ring due to relative rotation between the primary ring and the mating ring and form a gas layer between the mating ring and the primary ring that urges the primary ring away from the mating ring; wherein the at least one of the mating ring seal face and the primary ring seal face bears a solid coating comprising molybdenum disulfide, graphene oxide, and optionally polydopamine, preferably wherein the graphene oxide to molybdenum disulfide ratio is 8:10 to 10:8.

Aspect 24: The dry gas seal assembly of Aspect 23, wherein the mating ring, primary ring and biasing member are arranged in a housing.

Aspect 25: The dry gas seal assembly of Aspects 23 or 24 wherein the recesses draw gas from an inner diameter of the primary ring toward an outer diameter of the primary ring or draw the gas from an outer diameter of the primary ring toward an inner diameter of the primary ring.

Aspect 26: The dry gas seal assembly of any one of Aspects 23-25 wherein the seal face bearing the coating has a surface roughness of 0.05 to 0.4, preferably 0.1 to 0.25 Ra as measured by ISO 4288-1996.

Aspect 27: A method of use of the seal assembly at an operating conditions including one or more of the following: an operating temperature in the range of −50 to 200° C., dry nitrogen having a dew point of no more than −40° C.

What is claimed is:

1. A method of forming a low friction, wear-resistant seal assembly comprising: providing seal assembly components comprising a seal face substrate; suspending molybdenum disulfide flakes which have a dimension perpendicular to thickness in the range of about 300 to about 500 nanometers; in a carrier liquid to form a mixture; adding graphene oxide flakes to the mixture; forming a homogenous mixture of molybdenum disulfide and graphene oxide, and, a functionalizing agent to improve adhesion or the graphene oxide and molybdenum disulfide to the seal face substrate, wherein a weight ratio of the graphene oxide to the molybdenum disulfide is from 8:10 to 10:8 and depositing the homogeneous mixture on a portion or all of the seal face substrate, forming a wet film on the seal face substrate, and evaporating the carrier liquid to form a dry coating layer.

2. The method of claim 1 wherein the functionalizing agent comprises poly-dopamine.

3. The method of claim 1 wherein providing seal assembly components includes providing a mating ring having a mating ring seal face and a primary ring having a primary ring seal face; wherein the depositing on the seal face substrate comprising depositing on at least one of the mating ring seal face and the primary ring seal face and after forming the dry coating layer arranging the mating ring in housing.

4. The method of claim 1, wherein the carrier liquid comprises water, an alcohol, or both.

5. The method of claim 1, wherein the homogenous mixture is oil-free.

6. The method of claim 1, wherein depositing comprises spray coating.

7. The method of claim 1 wherein the seal face substrate comprises silicon carbide.

8. The method of claim 1, wherein the disposing the homogenous mixture is on the silicon carbide substrate at between 20° C. and 100° C.

9. The method of claim 1 wherein the suspended molybdenum disulfide are flakes that are commensurate in size or smaller than the graphene oxide flakes.

10. The method of claim 1, wherein the substrate, prior to disposing the homogenous mixture has a surface roughness of 0.05 to 0.4 Ra as measured by ISO 4288-1996.

11. The method of claim 1 wherein the dry film coating has a coefficient of friction of no greater than about 0.02.

12. The method of claim 1 wherein the dry film coating has a coefficient of friction of no greater than about 0.01.

13. The method of claim 1 wherein in the dry film coating the molybdenum disulfide flakes are encapsulated or at least partially encapsulated by graphene oxide.

14. The method of claim 1 wherein the suspended molybdenum disulfide are flakes that are smaller than the graphene oxide flakes.

15. A dry gas seal assembly for use with a rotating machine that includes a rotating shaft, the seal assembly comprising: a mating ring having a mating ring seal face; a primary ring having a primary ring seal face; where the mating ring and primary ring are positioned such that the mating ring seal face and the primary ring seal face are adjacent and facing each other; a first biasing member that urges the primary ring seal face toward the mating ring seal face; wherein at least one of the mating ring seal face and the primary ring seal faces includes recesses formed thereon that cause a gas to be drawn between the mating ring and the primary ring due to relative rotation between the primary ring and the mating ring and form a gas layer between the mating ring and the primary ring that urges the primary ring away from the mating ring wherein the at least one of the mating ring seal face and the primary ring seal face bears a solid coating comprising molybdenum disulfide, graphene oxide, and optionally poly dopamine wherein the molybdenum disulfide is in the form of flakes which have a dimension perpendicular to thickness in the range of about 300 to about 500 nanometers and wherein a weight ratio of the graphene oxide to the molybdenum disulfide is from 8:10 to 10:8.

16. The dry gas seal assembly of claim 15, wherein the mating ring, primary ring and biasing member are arranged in a housing.

17. The dry gas seal assembly of claim 15 wherein the recesses draw gas from an inner diameter of the primary ring toward an outer diameter of the primary ring or draw the gas from an outer diameter of the primary ring toward an inner diameter of the primary ring.

18. The dry gas seal assembly of claim 15 wherein the seal face bearing the coating has a surface roughness of 0.05 to 0.4 Ra as measured by ISO 4288-1996.

19. The dry gas seal assembly of claim 15 wherein the dry film coating the molybdenum disulfide flakes are encapsulated or at least partially encapsulated by graphene oxide.

20. A method of use of the seal assembly of claim 15 at an operating condition including one or more of the following: an operating temperature in the range of −50 to 200° C., dry nitrogen having a dew point of no more than −40° C.

* * * * *